United States Patent
Wang et al.

(10) Patent No.: US 12,041,667 B2
(45) Date of Patent: Jul. 16, 2024

(54) ROOT SET SELECTION FOR MULTI-ROOT PREAMBLE

(71) Applicant: QUALCOMM Incorporated, San Diego, CA (US)

(72) Inventors: Xiao Feng Wang, San Diego, CA (US); Iyab Issam Sakhnini, San Diego, CA (US); Dan Zhang, San Diego, CA (US); Peter Gaal, San Diego, CA (US); Jun Ma, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/003,835

(22) Filed: Aug. 26, 2020

(65) Prior Publication Data

US 2021/0068169 A1 Mar. 4, 2021

Related U.S. Application Data

(60) Provisional application No. 62/894,383, filed on Aug. 30, 2019.

(51) Int. Cl.
| | |
|---|---|
| *H04W 72/04* | (2023.01) |
| *H04L 5/00* | (2006.01) |
| *H04W 72/044* | (2023.01) |
| *H04W 74/00* | (2009.01) |
| *H04W 74/0833* | (2024.01) |

(52) U.S. Cl.
CPC ....... *H04W 74/0841* (2013.01); *H04L 5/0041* (2013.01); *H04L 5/0048* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 9,992,800 B2 * | 6/2018 | Yerramalli | H04W 74/0833 |
| 2008/0316961 A1 | 12/2008 | Bertrand et al. | |
| 2012/0294185 A1 * | 11/2012 | Queseth | H04W 74/008 |
| | | | 370/252 |
| 2013/0286958 A1 * | 10/2013 | Liang | H04J 11/0069 |
| | | | 370/329 |

(Continued)

FOREIGN PATENT DOCUMENTS

| | | |
|---|---|---|
| WO | 2018160111 A1 | 9/2018 |
| WO | 2019004694 A1 | 1/2019 |
| WO | 2020092059 A1 | 5/2020 |

OTHER PUBLICATIONS

International Search Report and Written Opinion—PCT/US2020/048166—ISA/EPO—dated Nov. 30, 2020.

(Continued)

*Primary Examiner* — Sai Aung
(74) *Attorney, Agent, or Firm* — Patterson & Sheridan, L.L.P/Qualcomm Incorporated

(57) ABSTRACT

Certain aspects of the present disclosure provide techniques for wireless communication. A method that may be performed by a base station (BS), the method including determining a plurality of root sets, wherein each root set of the plurality of root sets comprise at least a first root and a second root. In some examples, the method includes transmitting signaling that indicates the plurality of root sets.

26 Claims, 7 Drawing Sheets

(56) References Cited

U.S. PATENT DOCUMENTS

| | | | | |
|---|---|---|---|---|
| 2014/0211677 A1* | 7/2014 | Barbieri | ............ | H04W 74/0833 |
| | | | | 370/329 |
| 2015/0334743 A1* | 11/2015 | Chevallier | ........ | H04W 72/0453 |
| | | | | 370/329 |
| 2017/0055297 A1* | 2/2017 | Da | ...................... | H04L 27/2613 |
| 2017/0094686 A1* | 3/2017 | Ramamurthi | ....... | H04L 27/2633 |
| 2018/0138962 A1* | 5/2018 | Islam | .................. | H04B 7/0695 |
| 2018/0220466 A1* | 8/2018 | Park | .................. | H04W 74/0833 |
| 2018/0255586 A1* | 9/2018 | Einhaus | ............ | H04W 52/0219 |
| 2018/0279136 A1 | 9/2018 | Tsai et al. | | |
| 2019/0223226 A1 | 7/2019 | Zhao et al. | | |
| 2019/0254064 A1* | 8/2019 | Islam | .................... | H04W 16/00 |
| 2020/0015276 A1* | 1/2020 | Reial | ................ | H04W 72/0446 |
| 2020/0068617 A1 | 2/2020 | Yoon et al. | | |
| 2020/0351853 A1* | 11/2020 | Xiong | ................ | H04B 7/0695 |

OTHER PUBLICATIONS

Li Z., et al., "Random Access Preamble Design and Detection for Mobile Satellite Communication Systems", IEEE Journal on Selected Areas in Communications, vol. 36, No. 2, Feb. 2018, pp. 280-291.

* cited by examiner

ROOT SET SELECTION FOR MULTI-ROOT PREAMBLE

CROSS-REFERENCE TO RELATED APPLICATION(S)

This application claims benefit of and priority to U.S. Provisional Application No. 62/894,383, filed Aug. 30, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications and to techniques for selecting a root pair for physical random access channel preamble.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in wireless networks such as a non-terrestrial network (NTN).

Certain aspects provide a method for wireless communication at a base station. In some examples, the method includes determining a plurality of root sets, wherein each root set of the plurality of root sets comprise at least a first root and a second root. In some examples, the method includes broadcasting signaling that indicates the plurality of root sets. In some examples, the method includes receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

Certain aspects provide a base station (BS), comprising a memory and a processor communicatively coupled to the memory. In some examples, the processor is configured to determine a plurality of root sets, wherein each root set of the plurality of root sets comprise at least a first root and a second root. The BS may also include a transceiver. In some examples, the transceiver is configured to broadcast signaling that indicates the plurality of root sets. In some examples, the transceiver is configured to receive, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

Certain aspects provide a base station (BS), comprising means for determining a plurality of root sets, wherein each root set of the plurality of root sets comprise at least a first root and a second root. In some examples, the BS comprises means for broadcasting signaling that indicates the plurality of root sets. In some examples, the BS comprises means for receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

Certain aspects provide a non-transitory computer-readable storage medium that stores instructions that when executed by a processor of a base station (BS), cause the BS to perform a method of wireless communication, the method comprising determining a plurality of root sets, wherein each root set of the plurality of root sets comprise at least a first root and a second root. In some examples, the method includes broadcasting signaling that indicates the plurality of root sets. In some examples, the method includes receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

Certain aspects provide for determining a plurality of root sets further comprises determining root sets for each beam of a plurality of beams based on one or more parameters associated with each beam; and broadcasting signaling that indicates the plurality of root sets further comprises transmitting one or more root sets over each beam of the plurality of beams.

In certain aspects, each root set of the plurality of root sets correspond to one of a plurality of preamble sequences; the preamble sequence comprises aspects corresponding to the corresponding first root and the corresponding second root; and the aspects corresponding to the corresponding first root and the corresponding second root are received over a same time period and frequency range.

In certain aspects, a modular multiplicative inverse of a difference between a modular multiplicative inverse of the corresponding first root and a modular multiplicative inverse of the corresponding second root is a first integer within a range of integers.

In certain aspects, the modular multiplicative inverse of the corresponding first root is one of: a second integer chosen from the range of integers, or a third integer being a difference between a sequence length of the corresponding first root and a fourth integer chosen from the range of integers.

In certain aspects, wherein broadcasting signaling comprises broadcasting signaling that indicates the corresponding first root and the corresponding second root.

In certain aspects, a modular multiplicative inverse of the corresponding first root is a first integer within a range of integers; the corresponding second root is a conjugate of the corresponding first root; and broadcasting signaling comprises broadcasting signaling that indicates the corresponding first root and the corresponding second root.

In certain aspects, a modular multiplicative inverse of a difference between 1 and a product of the corresponding first root and a modular multiplicative inverse of the corresponding second root is a first integer within a range of integers; and broadcasting signaling comprises broadcasting signaling that indicates the corresponding first root and the corresponding second root such that a modular multiplicative inverse of a difference between a modular multiplicative inverse of the corresponding first root and a modular multiplicative inverse of the corresponding second root is the first integer within the range of integers.

In certain aspects, a modular multiplicative inverse of a difference between a modular multiplicative inverse of the corresponding first root and a modular multiplicative inverse of the corresponding second root is a first integer within a range of integers; a modular multiplicative inverse of a difference between 1 and a product of the corresponding second root and an inverted third root of the first root set is a second integer within a range of integers; and broadcasting signaling comprises broadcasting signaling that indicates the first root set comprising the corresponding first root, the corresponding second root, and the third root.

In certain aspects the preamble sequence is further based on the third root.

In certain aspects, the preamble sequence based at least in part on the corresponding first root, the corresponding second root, and the third root is received over a same time period and frequency range.

Aspects of the present disclosure provide means for, apparatus, processors, and computer-readable mediums for performing techniques and methods that may be complementary to the operations by the BS described herein, for example, by a satellite.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
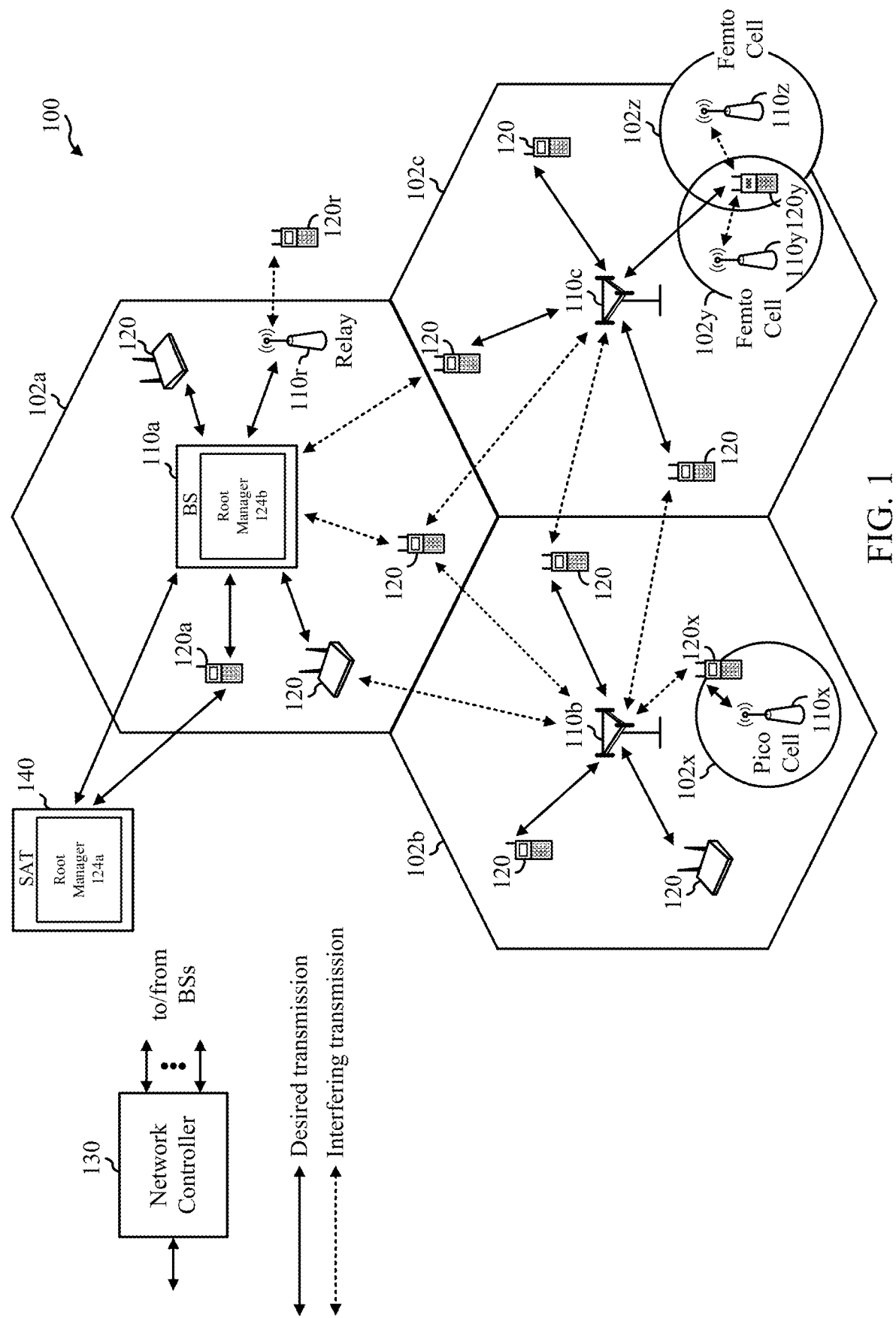
FIG. 1 is a diagram conceptually illustrating an example telecommunications network, in accordance with certain aspects of the present disclosure.

Aspects of the present disclosure provide apparatus, methods, processing systems, and computer readable mediums that support multiple root (e.g., two-root and/or three-root) preamble design for estimating delay and frequency shift (e.g., Doppler shift). Generally, the described techniques provide for improved communications, such as in a non-terrestrial network (NTN), including detecting the round-trip delay (RTD) and frequency shift associated with distances and relative velocities in an NTN. The described techniques provide for selecting multiple roots that may be suitable for estimating delay and frequency shift, and communicating the selected roots to a user equipment (UE) for enhancing random access process. The UE utilizes the selected roots to generate a two-root, three-root, or more root preamble that may enable detection by a satellite or base station of the RTD and/or Doppler shift. The satellite may then determine the RTD and Doppler shift based on the multi-root preamble.

The following description provides examples of root selection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Non-terrestrial networks (NTNs) may be wireless communications systems involving the use of satellites to provide coverage for terrestrial base stations and user equipment (UEs). One or more satellites may be included in an NTN. Some satellites in an NTN may operate as base stations, and UEs may communicate directly with a serving satellite. In other cases, base stations or other satellites may relay transmissions between a serving satellite and a UE.

Satellites may refer to vehicles operating in a variety of Earth orbits, and in certain distances from the surface of the Earth. For example, satellites may function in low Earth orbit (LEO), medium Earth orbit (MEO), geostationary Earth orbit (GEO), geosynchronous orbit (GSO), highly elliptical orbits (HEO), or another type of orbit. Each type of orbit may be defined for certain ranges of distances away from the surface of the Earth. The distance between a UE and a serving satellite may be much greater than typical distances between a UE and a base station in a terrestrial network.

The distance between the satellite and the UE may lead to a round-trip delay (RTD) and a frequency shift that may negatively impact efficiency and communications functionality between the UE and the satellite. The frequency shift in the communications frequency between the satellite and the UE may be caused by the Doppler shift and by local oscillator error. For example, a satellite may be 600 kilometers (km) from the Earth's surface. The satellite may have a small cell diameter of 100 km, and may observe a frequency shift of up to 125 kilohertz (kHz).

A UE may determine to connect to a new cell or base station (such as a satellite) based on a variety of communication parameters, movement of the UE, or the initiation of a handover procedure. In order to initiate communication with a different cell, the UE may transmit a random access channel (RACH) preamble to begin the random access procedure of connecting to a new cell. The transmission of the preamble may occur in a physical random access channel (PRACH), and the preamble may be transmitted as part of a multiple step random access process.

The random access process of a UE connecting to a cell may include multiple steps. The UE may transmit a preamble message (e.g., PRACH Msg1) to a base station (e.g., a satellite). The base station may transmit a preamble response (e.g., PRACH response Msg2) based on the received preamble. Based on receiving the preamble response, the UE may transmit a radio resource control (RRC) connection request (e.g., Msg3) to the base station. The base station may respond with an RRC connection setup message (e.g., Msg4). Each of these messages may be transmitted back and forth between a UE and a base station. In a terrestrial network, the RTD may have a small impact on messaging delays, and the Doppler shift and frequency may also have a minor impact.

However, the RTD and frequency shift due to the long-distance aspects of an NTN in cases where the base station is an orbiting satellite may impede the transmission timing of random access procedure transmissions. This may impact and interfere with transmissions to and from the satellite and the UE for the random access process and of other messages transmitted after the UE is connected to the cell. Further, the frequency shift caused by the Doppler effect associated with an NTN may impact accurate message reception and may lead to inaccurately decoded messages and inefficient transmissions.

In some cases, the design of a preamble (e.g., an NR PRACH preamble) may not include an ability for the receiving base station or satellite to accommodate a large (differential) RTD or large frequency shift due to the Doppler effect, and may also not include an ability to estimate RTD or frequency shift. For example, these preambles may support up to 684 microsecond (μs) RTD and up to 10 kilohertz (kHz) frequency shift within a cell. These limits may be much smaller than differential RTD and frequency shift for an NTN.

These preambles may include a preamble sequence based on one or more Zadoff-Chu (ZC) roots, plus a cyclic shift. For example, multiple preamble sequences may be generated by the UE based on a single ZC root, wherein each of the multiple preamble sequences are a cyclic shift from another of the multiple preamble sequences. With this preamble design, in order to be able to identify RTD and the frequency shift (e.g., due to the Doppler effect), the cyclic shift would need to be large enough to encompass the shift caused by both the RTD and the frequency shift. This may also assume that RTD is less than the cyclic shift and the frequency shift is less than 1 or 2 times the sub-carrier spacing (SCS). The RTD and frequency shift associated with an NTN may not meet these requirements of the cyclic shift and preamble for some types of preambles, such as in NR systems. It should be noted that a ZC root or ZC roots may also be referred to herein as "root" or "roots."

In cases where the RTD and the frequency shift are large due to the transmission distances in an NTN, a UE may instead generate a preamble that uses preamble sequences generated based on the ZC roots and orthogonal frequency division multiplexing (OFDM) modulation, but does not utilize a cyclic shift. These multi-root preambles may support communications in networks with larger frequency shifts and longer RTDs. For example, some preambles may support a frequency shift range of ±500 kHz, and an RTD range of up to the minimum of the cyclic prefix (CP) and guard time (GT) (e.g., min (CP, GT)).

Aspects of the disclosure are initially described in the context of wireless communications systems. Aspects of the disclosure are further described in relation to determining a plurality of roots based on one or more parameters associated with a beam, and communicating the plurality of roots to a UE or BS.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x.

The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) and satellites 140 in the wireless communication network 100. The UEs 120 (e.g., 120x, 120y, etc.) may be dispersed throughout the wireless communication network 100, and each UE 120 may be stationary or mobile.

Satellite 140 may communicate with BSs 110 (e.g., BS 110a) and UE 120 (e.g., UE 120a). Satellite 140 may be any suitable type of communication satellite configured to relay communications between different end nodes in a wireless communication network. Satellite 140 may be an example of a space satellite, a balloon, a dirigible, an airplane, a drone, an unmanned aerial vehicle, and/or the like. In some examples, the satellite 140 may be in a geosynchronous or geostationary Earth orbit, a low Earth orbit or a medium Earth orbit. Satellite 140 may be a multi-beam satellite configured to provide service for multiple service beam coverage areas in a predefined geographical service area. The satellite 140 may be any distance away from the surface of the Earth.

In some cases, a cell 102 may be provided or established by a satellite 140 as part of a non-terrestrial network. Satellite 140 may, in some cases, perform the functions of a BS 110, act as a bent-pipe satellite, or may act as a regenerative satellite, or a combination thereof. In other cases, satellite 140 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 140) may receive a signal from a BS 110 and may relay the signal to a UE 120 or another BS 110, or vice-versa.

UE 120 may communicate with satellites 140 using wireless communications links. Satellite 140 may transmit control signaling to BSs 110 and UEs 120 in the form of a system information block (SIB). The SIB may include multiple root selections that the UE 120 may utilize for a random access procedure. The UE 120 may utilize a random access procedure, including a preamble transmission based on the multiple root selections, to obtain communication access with the satellite 140. The satellite 140 may orbit Earth, and communications between a UE 120 and a satellite 140 may be associated with a long RTD and a frequency shift. The UE 120 may generate and transmit a two-root and/or three-root preamble for detection of the RTD and frequency shift.

According to certain aspects, the BSs 110 and satellite 140 may be configured for multiple root selection. As shown in FIG. 1, the BS 110a includes a root manager 124b. The root manager 124b may be configured to select a beam from a plurality of beams originating at the BS 110a; determine one or more parameters associated with the beam; determine a plurality of root sets based on the one or more parameters associated with the beam, wherein each of the plurality of root sets corresponds to one of a plurality of preamble sequences; and transmit control signaling that indicates the plurality of root sets to a UE, in accordance with aspects of the present disclosure. For example, the satellite 140 may broadcast, multi-cast, or unicast the control signaling.

As shown in FIG. 1, the satellite 140 includes a root manager 124a. The root manager 124a may be configured to select a beam from a plurality of beams originating at the satellite 140; determine one or more parameters associated with the beam; determine a plurality of root sets based on the one or more parameters associated with the beam, wherein each of the plurality of root sets corresponds to one of a plurality of preamble sequences; and broadcast control signaling that indicates the plurality of root sets to a UE, in accordance with aspects of the present disclosure.

In some examples, the root managers 124a/124b may be configured to determine a root set per beam based on one or more parameters associated with each beam, wherein each root set corresponds to one of a plurality of preamble sequences. The root managers 124a/124b may also be configured to broadcast signaling that indicates the root set per beam to a UE.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
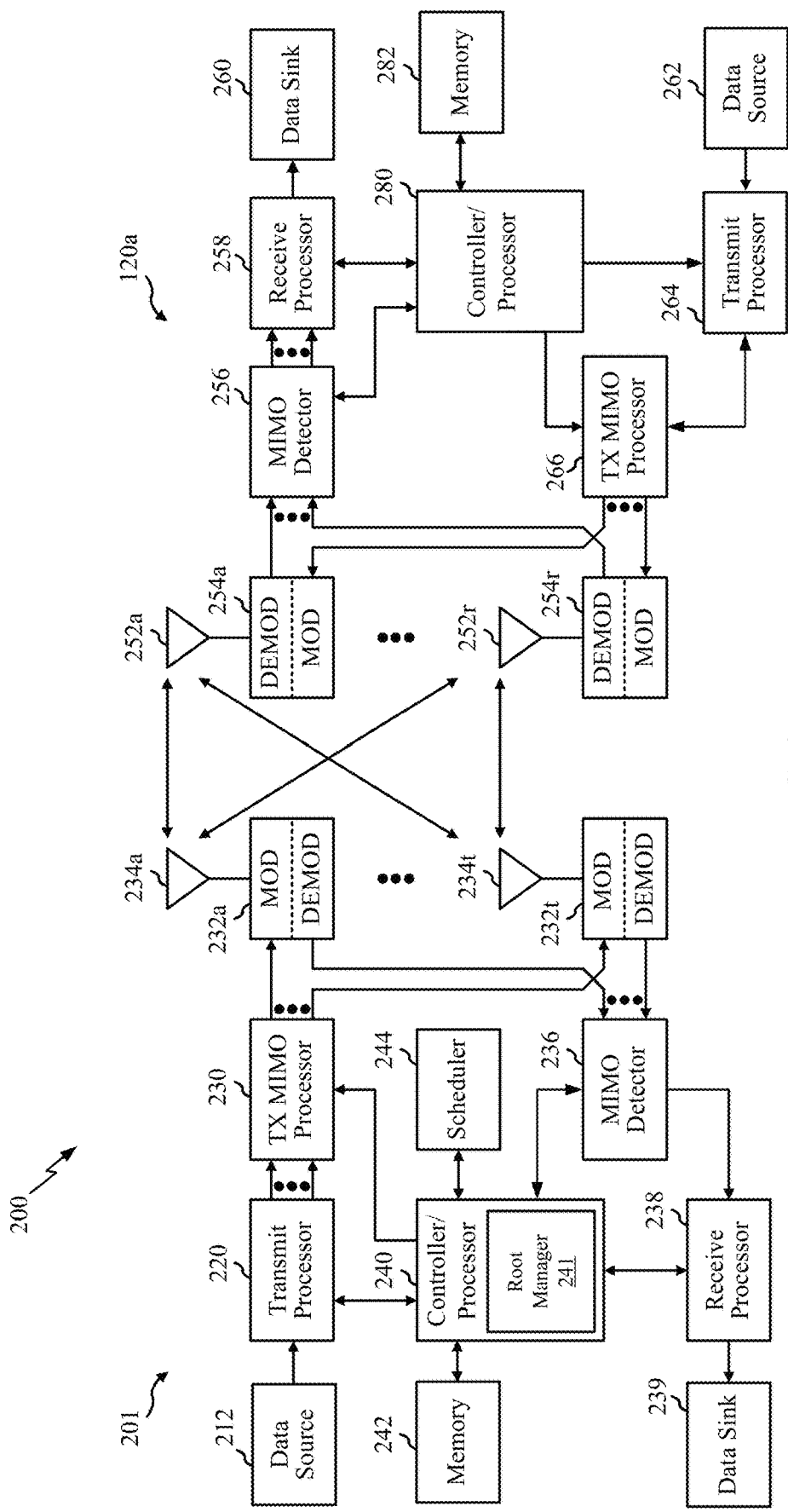
FIG. 2 is a block diagram conceptually illustrating a design of an example a base station (BS) and user equipment (UE), in accordance with certain aspects of the present disclosure.

FIG. 2 illustrates example components 200 of a network entity 201 (e.g., the BS 110a or satellite 140 in the wireless communication network 100 of FIG. 1) and UE 120a (e.g., in the wireless communication network 100 of FIG. 1), which may be used to implement aspects of the present disclosure.

At the network entity 201, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the network entity 201 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the network entity 201. At the network entity 201, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for network entity 201 and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. Further, as shown in FIG. 2, the controller/processor 240 of the network entity 201 has a root manager 241 that may be configured for selecting a beam from a plurality of beams originating at the network entity; determine one or more parameters associated with the beam; determine a plurality of root sets based on the one or more parameters associated with the beam, wherein each of the plurality of root sets corresponds to one of a plurality of preamble sequences; and broadcast control signaling that indicates the plurality of root sets to a UE, according to aspects described herein.

In some examples, the root manager 241 may be configured to determine a root set per beam based on one or more parameters associated with each beam, wherein each root set corresponds to one of a plurality of preamble sequences. The root manager 241 may also be configured to broadcast signaling that indicates the root set per beam to a UE. Although shown at the controller/processor 240, other components of the network entity 201 may be used performing the operations described herein.

Figure 3:
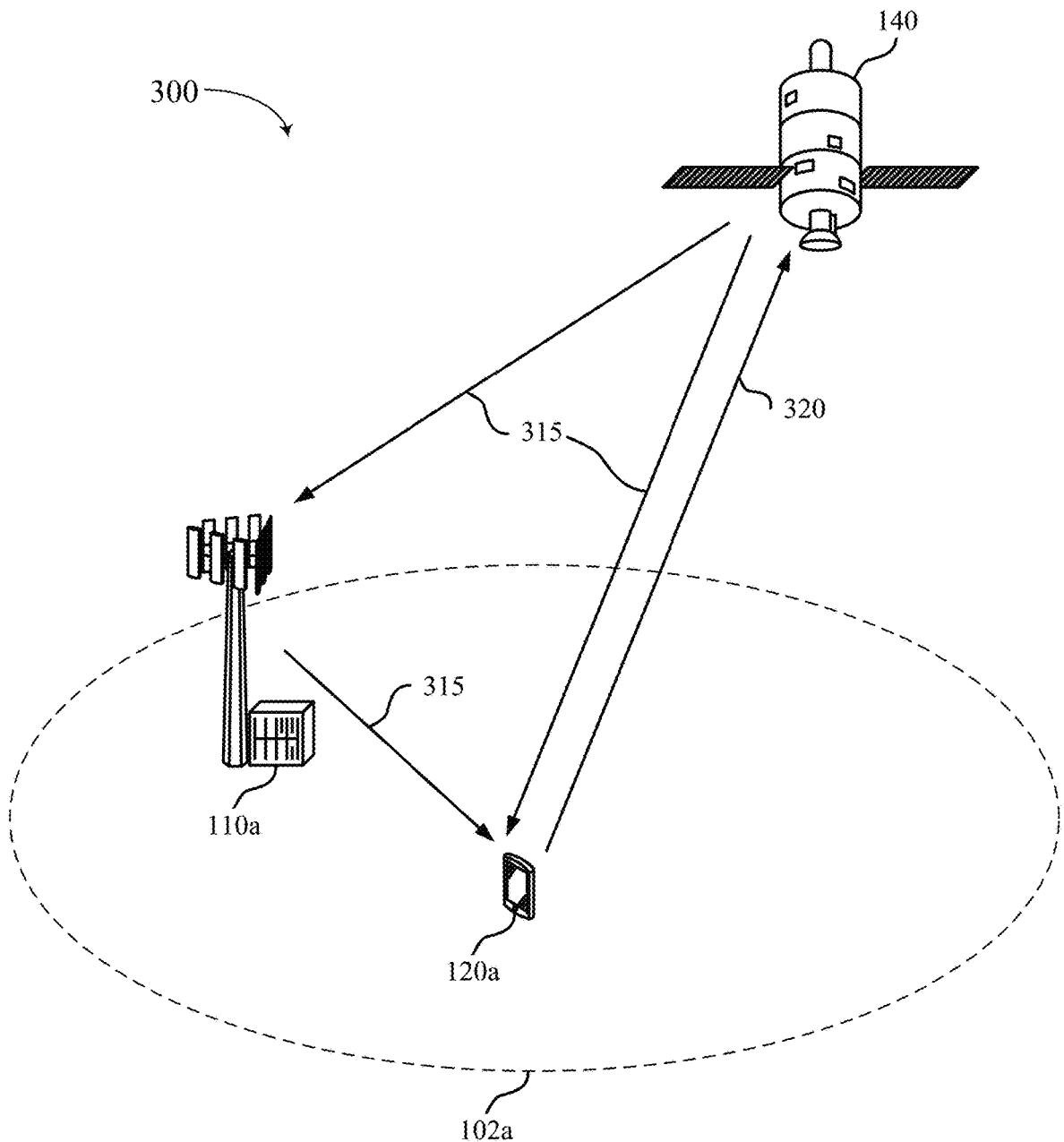
FIG. 3 is a diagram illustrating an example of a wireless communications system that supports selecting a multi-root preamble for delay and frequency shift, in accordance with certain aspects of the present disclosure.

FIG. 3 illustrates an example of a wireless communications system 300 that supports multiple-root selection and multiple-root preamble communication for delay and frequency shift in accordance with aspects of the present disclosure. In some examples, wireless communications system 300 may implement aspects of wireless communication network 100. For example, wireless communications system 300 may include BS 110a, UE 120a, and satellite 140, which may be examples of BS 110, UE 120, and satellite 140 as described with reference to FIG. 1. Base station 110a may serve coverage area or cell 102a in cases of a terrestrial network, and satellite 140 may serve coverage area 102a in cases of an NTN.

Satellite 140 may communicate with BS 110a and UE 120a as part of wireless communications in an NTN. In cases of a terrestrial network, UE 120a may communicate with BS 110a over a communication link. In the case of NTN wireless communications, satellite 140 may be the serving BS for UE 120a. In certain aspects, the BS 110a may act as a relay for the satellite 140, relaying control signaling 315 from the satellite 140 to the UE 120a.

Satellite 140 may orbit the Earth's surface at a particular altitude. The distance between satellite 140 and UE 120a may be much greater than the distance between BS 110a and UE 120a. The distance between UE 120a and satellite 140 may cause an increased RTD in communications between UE 120a and satellite 140. The distance may also cause a frequency shift in communications between UE 120a and satellite 140. The frequency shift may be caused by the Doppler effect and error related to the local oscillation of either UE 120a or satellite 140. The RTD and frequency shift associated with communications in NTNs may lead to inefficiency in transmissions, latency, and inability to accurately transmit and receive messages.

UE 120a may determine to connect to satellite 140 using a random access procedure (e.g., a four-step RACH). The initiation of the RACH procedure may begin with the transmission of a random access preamble (e.g., NR PRACH) by UE 120*a* to satellite 140 or base station 110*a*. UE 120*a* may transmit the random access preamble in the PRACH. In some PRACH designs, there may be no estimation or accounting for the RTD or the frequency shift associated with NTNs.

In order to estimate RTD and frequency shift associated with communication with orbiting satellite 140 in an NTN, satellite 140 may configure the UE 120 with a two-root preamble or a three-root preamble to initiate the random access procedure to connect to satellite 140. In certain aspects, the multi-root preamble may be based on control signaling 315 broadcasted by satellite 140 over a SIB. Control signaling 315 may include information related to possible ZC roots and sequences for UE 120*a* to use to generate a preamble. In some cases, the control signaling 315 may include a set of possible ZC roots and/or a set of preamble sequences that the UE 120*a* may select from to generate a preamble. Here, the set of possible ZC roots may be determined by the satellite 140 to allow the satellite 140 to estimate the RTD and/or the frequency shift associated with communications with the UE 120*a*. In some examples, the set of possible ZC roots may be determined based on parameters associated with a particular beam used by the satellite 140. The one or more parameters may include at least a location of the beam, a size of the beam, an elevation of the beam, an angle of the beam, and any other suitable beamforming characteristics of the selected beam.

Alternatively, the set of roots and sequences may be preconfigured at the UE 120*a*, and the control signaling 315 may include bits to indicate to UE 120*a* an index of select roots and/or preamble sequences that the UE 120*a* may use to generate the multi-root preamble.

The control signaling 315 may include an indication of multiple roots for two or three preamble sequences. Each of the two or three preamble sequences may generated based on a different root. A root may be labeled as $\mu_n$. The roots used to generate the preamble sequences, for example, may be defined as $\mu_0$ and $\mu_1$, or as $\mu_0$, $\mu_1$, and $\mu_2$, where $\mu_0 \neq \mu_1 \neq \mu_2$.

In certain configurations, a multi-root preamble sequence length may be greater than a CP (e.g., sequence length>cyclic prefix) and the guard period (GP) may exceed the RTD. The CP plus the GP of the preamble may be configured to be greater than the RTD between the UE 120*a* and the satellite 140. Further, the sequence length multiplied by the SCS of a communication channel between the UE 120*a* and the satellite 140 can be configured to be greater than 2 times the maximum of the magnitude of the frequency shift. Thus, the sequence length of the multi-root preamble sequence may satisfy the following equation:

$$\text{sequence}_{length} \times \text{SCS} > 2 \times \max |Fd| \quad (1)$$

where maxFd is the frequency shift caused by the distance between the UE 120*a* and the satellite 140.

For example, a preamble may include a preamble sequence having a length of 839 (e.g., Len-839), and may operate in a system with an SCS of 1.25 kHz. This preamble sequence length and SCS may be plugged into Equation 1 as follows:

$$\pm 839 \times 1.25 > 2 \times \max Fd \quad (2)$$

Thus, the preamble sequence (Len-839) may mitigate frequency shifts for frequency shifts of up to ±524 kHz.

In some examples, the UE may select a particular preamble based on the generation, by the UE, of a preamble set. In some cases, a particular radio access technology (RAT) may utilize a particular preamble set size P (e.g., P=64 in NR). Based on this set size P, P number of preambles containing one or more preamble sequences based on pairs ($\mu_{0j}$, $\mu_{1j}$) or triplets ($\mu_{0j}$, $\mu_{1j}$, $\mu_{2j}$) of roots may be generated, such that j=0, 1, ..., P−1. In certain aspects, multiple roots may be generated such that $\mu_{0j} \neq \mu_{0j'}$, and $\mu_{1j} \neq \mu_{1j'}$ for j≠j'. In certain aspects, for a preamble set size P, P pairs ($\mu_{0j}$, $\mu_{1j}$), j=0, 1, ..., P−1 may be generated such that $\mu_{0j} \neq \mu_{0j'}$ or $\mu_{1j} \neq \mu_{1j'}$ for j≠j'. In this second case, there may be, in some instances, at most a number q pairs (e.g., q=2) with the same first root, and at most q pairs with the same second root.

UE 120*a* may randomly select a pair or triplet of ZC roots from a set of possible ZC roots. The satellite 140 may signal this set of possible ZC roots to UE 120*a* or BS 110*a* in control signaling 315. Using the selected ZC roots, UE 120*a* may generate a full preamble sequence including a CP. In some cases, the sequences corresponding to each ZC root may be modulated into different OFDM symbols with corresponding CPs, and in some cases the sequences corresponding to each ZC root may be modulated into the same OFDM symbol with one leading CP.

The satellite 140 may receive a multi-root preamble signal 320 from the UE 120*a* to initiate a random access procedure. Satellite 140 may receive the preamble signal 320, and may determine the RTD and Doppler shift based on the preamble signal 320.

Figure 4A:
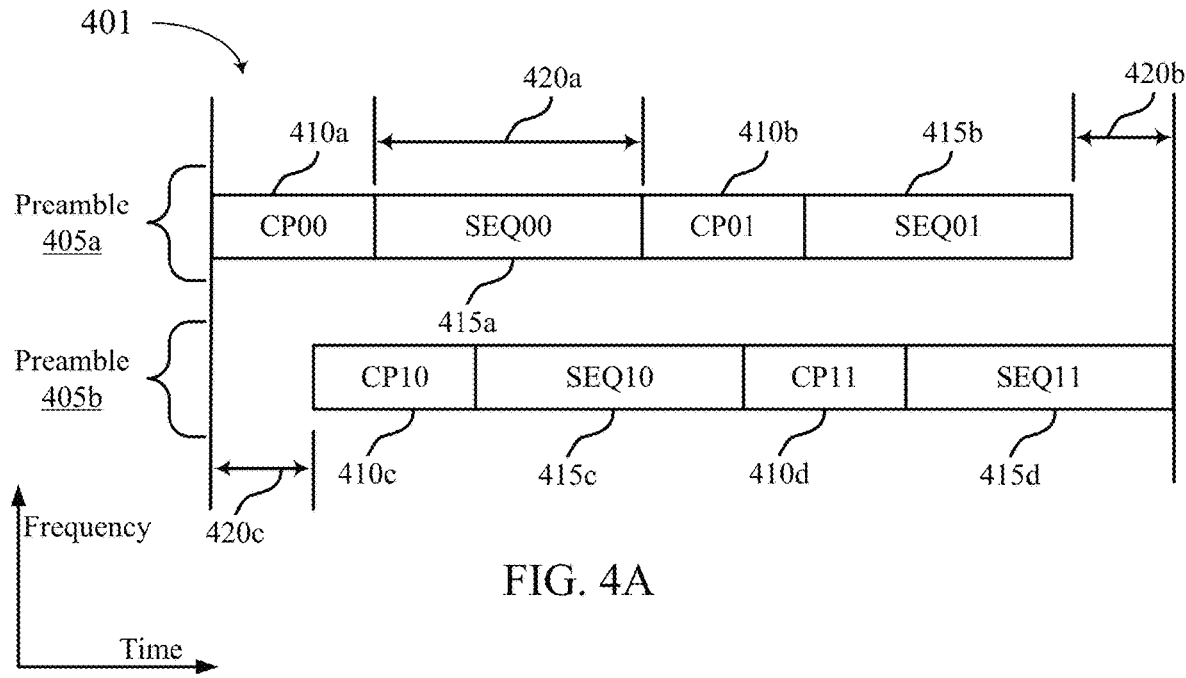
FIGS. 4A and 4B are block diagrams illustrating examples of two-root preamble designs for delay and frequency shift, in accordance with certain aspects of the present disclosure.

FIG. 4A illustrates an example of a two-root preamble design 401 for delay and frequency shift in accordance with aspects of the present disclosure. In some examples, preamble design 401 may implement aspects of wireless communication network 100. A two-root preamble 405 generated according to preamble design 401 may be transmitted by a UE 120*a* to a satellite 140 based on control signaling 315 from the satellite 140 as described with respect to FIG. 3.

Preamble 405*a* may be an example of one possible preamble generated by the UE 120*a* based on a first root (e.g., $\mu_{0j}$) and a second root (e.g., $\mu_{1j}$) of a first ZC root pair (e.g., ($\mu_{0j}$, $\mu_{1j}$)) selection. Preamble 405*b* may be an example of another possible preamble generated by the UE 120*a* based on a third root (e.g., $\mu_{2j}$) and a fourth root (e.g., $\mu_{3j}$) of a second ZC root pair (e.g., ($\mu_{2j}$, $\mu_{3j}$)) selection. There may be a number of further possible preambles 405 based on a number of other possible ZC root selections. For example, a preamble 405 may be based on a pair of roots (e.g., root pair) or a triplet of roots (e.g., root triplet). A two-root preamble design 401 may lead to a longer symbol length and a lower peak-to-average power ratio (PAPR). A three-root preamble design (e.g., three-root preamble design 402 of FIG. 4B) may lead to a longer symbol length relative to the two-root preamble design 401.

In certain aspects, a UE 120*a* may generate a first preamble 405*a* and a second preamble 405*b*, and optionally a subsequent preamble (e.g., up to 64 preambles in the case of 5G NR). In this example, the first preamble 405*a* includes at least a first preamble sequence (e.g., SEQ00) generated by the UE 120*a* based on the first root (e.g., $\mu_{0j}$), and a second preamble sequence (e.g., SEQ01) generated by the UE 120*a* based on the second root (e.g., $\mu_{1j}$). The second preamble 405*b* includes at least a third preamble sequence (e.g., SEQ10) generated by the UE 120*a* based on the third root (e.g., $\mu_{2j}$), and a fourth preamble sequence (e.g., SEQ11) generated by the UE 120*a* based on the fourth root (e.g., $\mu_{3j}$).

As discussed, the UE 120*a* may select a pair of ZC roots, or alternatively, select a pair of preamble sequences, from the set of ZC roots or set of preamble sequences received by the UE 120*a* from the satellite 140 (e.g., advertised by the satellite 140 via control signaling 315). The UE 120*a* may then generate the first preamble 405*a* based on the selected pair of ZC roots or preamble sequences. In one example, the first preamble 405a includes a first cyclic prefix (e.g., CP00 410a), and the first preamble sequence (e.g., SEQ00) which corresponds to the first root of the first ZC root pair or a first preamble sequence selected from the set of ZC roots or set of preamble sequences. SEQ00 may be modulated into one OFDM symbol 415a of length 420a. The first preamble 405a also includes a second cyclic prefix (e.g., CP01 410b) and a second preamble sequence (e.g., SEQ01) which corresponds to a second root of the first ZC root pair or a second preamble sequence selected from the selected from the set of ZC roots or set of preamble sequences. SEQ01 may be modulated into a second OFDM symbol 415b. Subsequently, the two OFDM symbols 415 may be concatenated back-to-back including the corresponding CPs 410. Thus, the first preamble 405a may include, sequentially: CP00 410a, SEQ00 in OFDM symbol 415a, followed by CP01 410b, and SEQ01 in OFDM symbol 415b.

A second preamble 405b may be generated by the UE 120a in a manner similar to the first preamble 405a. A third cyclic prefix (e.g., CP10 410c) and a third preamble sequence (e.g., SEQ10) may be modulated into one OFDM symbol 415c, concatenated back to back with a fourth cyclic prefix (e.g., CP11 410d) and a fourth preamble sequence (e.g., SEQ11), where SEQ11 is modulated into a second OFDM symbol 415d. Here, each of SEQ10 and SEQ11 may be generated by the UE 120a based on a corresponding root of the second ZC root pair selected from the set of ZC roots, or based on a selected pair of preamble sequences from the set of preamble sequences transmitted by the satellite 140. The second preamble 405b may be offset from the first preamble 405a by a guard period (GP) 420c. GP 420c may be less than or equal to the RTD of the communications between the UE 120a and the satellite 140. The end of preamble 405a and the end of preamble 405b may also be separated by a GP 420b. GP 420b may also be less than or equal to the RTD.

Figure 4B:
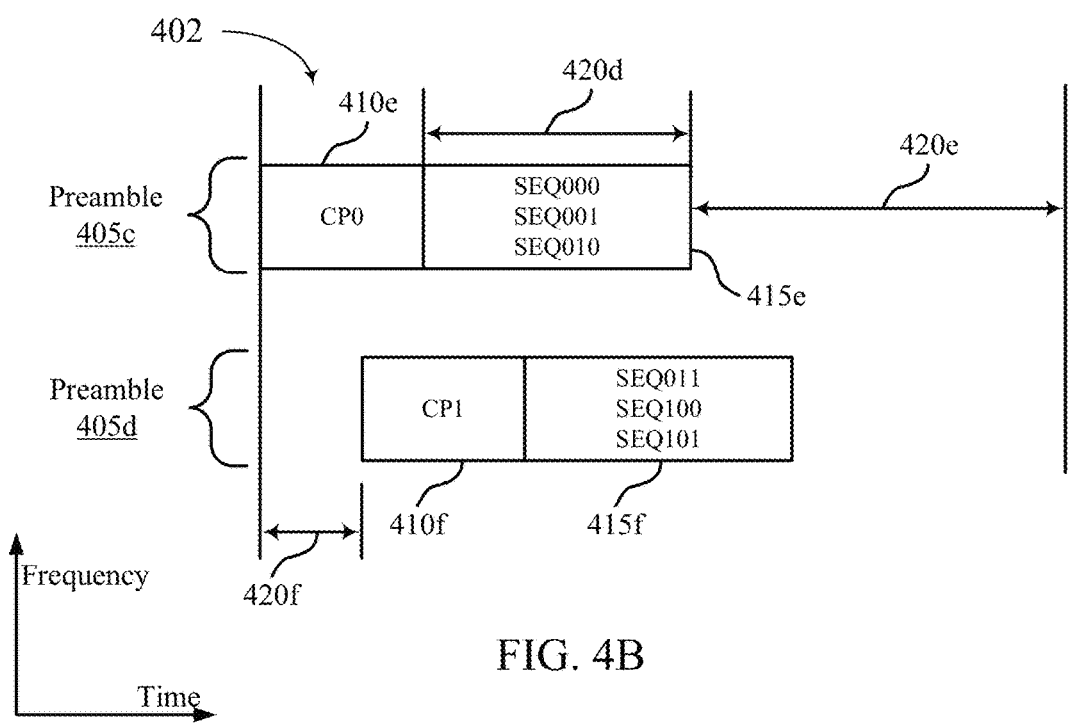

FIG. 4B illustrates an example of a three-root preamble design 402 for delay and frequency shift in accordance with aspects of the present disclosure. It should be noted that the following techniques may be used for a two-root preamble design, which is within the scope of the disclosure. A three-root preamble design 405 generated according to preamble design 402 may be transmitted by a UE 120a to a satellite 140 as described with respect to FIG. 3.

A first preamble 405c of FIG. 4B may be an example of one possible preamble generated by the UE 120a based on a first ZC root triplet selected from the set of ZC roots transmitted to the UE 120a from the satellite 140, or based on a selected first triplet of preamble sequences from the set of preamble sequences transmitted by the satellite 140. A second preamble 405d may be an example of another possible preamble generated by the UE 120a based on a second ZC root triplet selected by the UE 120a, or based on a selected second triplet of preamble sequences. There may be a number of further possible preambles 405 based on a number of other possible ZC root pairs or triplets. For example, one or more of preambles 405c and 405d may be generated based on a ZC root pair (e.g., a set of two roots).

In certain aspects, a UE 120a may generate the first preamble 405c and the second preamble 405d, and optionally a subsequent preamble (e.g., up to 64 preambles in the case of 5G NR). The three-root preamble design 402 may result in a shorter symbol as compared to two-root preamble design 401 at the cost of a high PAPR.

As discussed, the UE 120a may select three ZC roots, or alternatively, select three preamble sequences, from the set of ZC roots or set of preamble sequences received by the UE 120a from the satellite 140 (e.g., advertised by the satellite 140 via control signaling 315). The UE 120a may then generate a triplet of preamble sequences (e.g., SEQ011, SEQ100, and SEQ101), wherein each preamble sequence is generated by the UE 120a based on a corresponding ZC root of the selected three ZC roots. In some examples, the UE 120a may also a portion of the end of the preamble sequence (e.g., SEQ000) and place the copied portion at the beginning (e.g., CP0 410e) of the preamble 405c, so that detection of the preamble 405c by the base station or satellite may overlap with the end of the CP0 410e and still detect the entire preamble sequence.

The preambles 405 in preamble design 402 may be generated using a different modulation scheme than the preambles described in preamble design 401. In this case, the first preamble 405c may be generated by a UE 120a based on control signaling from the satellite 140. The three sequences corresponding to the three selected ZC roots may be modulated into a single OFDM symbol 415e (e.g., on different subcarriers). For example, SEQ000 may be associated with a first ZC root, SEQ001 may be associated with a second ZC root, and SEQ010 may be associated with a third ZC root. SEQ000, SEQ001, and SEQ010 may be DFT-transformed onto the same or different frequency bands (e.g., on adjacent or non-adjacent sub-carriers), and then modulated into a single OFDM symbol 415e. The generation of preamble 405c may include a CP0 410e added to the beginning of the OFDM symbol 415e.

A second preamble 405d may be generated in a similar manner as preamble 405c. However, preamble 405d may include a GP 420f that separates the beginning of the CP1 410f from the beginning of CP0 410e and its corresponding sequence in time. For preamble 405d, three sequences, SEQ011, SEQ100, and SEQ101 may be generated based on three different ZC roots. The three sequences SEQ011, SEQ100, and SEQ101 may be DFT-transformed onto the same or different frequency bands, and then may be modulated into a single OFDM symbol 415f. One or more preambles 405 may be similarly generated, and thus preamble design 402 may be applied to generate a desired number of preambles 405. The UE 120a may select one of the preambles 405 (e.g., 405c), generate a preamble signal using the selected preamble 405a, and transmit the preamble signal during a random access procedure (e.g., RACH procedure).

The satellite 140 detects the roots ($\mu_0$ and $\mu_1$) or ($\mu_0$, $\mu_1$, and $\mu_2$) of a preamble transmitted by the UE 120a. Based on detecting the roots, satellite 140 may estimate the RTD and the frequency shift. In a system where there may be q number of same roots there may be q possible peak locations retained by the satellite 140. However, the detection of the roots may remain unambiguous regardless of the number of possible peak locations.

In some cases, the satellite 140 may assume that q=1. In this case, a number of assumptions may be included in the estimation of the RTD and frequency shift. These assumptions may include that peak locations are integer multiples of samples, where the samples may be denoted by $b_0$, $b_1$. The assumptions may also include that the RTD is measured in integer numbers of samples, that the Doppler shift is measured in an integer multiple of SCS, and that roots $\mu_0$ and $\mu_1$ have modular multiplicative inverse roots $\mu_0^{-1}$, and $\mu_1^{-1}$. Based on these assumptions, two equations can be solved in order to calculate RTD (denoted as delay in Equation 3) and frequency shift (denoted as Doppler in Equation 3).

$$\text{delay} + \text{doppler} \times \mu_n^{-1} = b_n (\text{mod } L) \quad (3)$$

Satellite 140 may solve equation 3 for each root $\mu_0$ and $\mu_1$, where $b_n$ indicates a detected peak location, and L indicates a sequence length. In some situations, the range of delay may be less than L and the range of Doppler may be less than L. In such cases, Equations 4-6 in the following solution may uniquely identify delay and Doppler. The solution equation for Doppler is as follows:

$$\text{doppler} = (\mu_0^{-1} - \mu_1^{-1})^{-1} \times (b_0 - b_1)(\text{mod } L) \quad (4)$$

The solution equation for delay is as follows:

$$\text{delay} = b_0 - \mu_0^{-1}(\mu_0^{-1} - \mu_1^{-1})^{-1} \times (b_0 - b_1)(\text{mod } L) \quad (5)$$

or $$\text{delay} = b_0 - (1 - \mu_0\mu_1^{-1})^{-1} \times (b_0 - b_1)(\text{mod } L) \quad (6)$$

In cases where the range of delay is less than the sequence length L of the preamble, and the range of Doppler is less than the sequence length L of the preamble, Equations 4-6 may uniquely identify the RTD and the Doppler shift caused by the distance between the UE 120a transmitting the preamble and the satellite 140 (or base station 110a in cases of a terrestrial network) that receives and demodulates the preamble.

The estimation of RTD and Doppler shift may depend on the location of detected peaks. This may lead to potential error in estimations found by Equations 4-6. The error may occur in number of samples $b_0$ and $b_1$. The error in these samples is scaled by $(\mu_0^{-1} - \mu_1^{-1})^{-1}$ as shown in Equations 4-6. Thus, error may be decreased by selecting root pairs $\mu_0$ and $\mu_1$ such that $(\mu_0^{-1} - \mu_1^{-1})^{-1} = 1$ or is small (e.g., less than or equal to a threshold), so that any potential error in $b_0$ and $b_1$ may not be scaled by a factor greater than 1.

Example Techniques for Selecting Root Sets for Multi-Root PRACH Preamble

Figure 5:
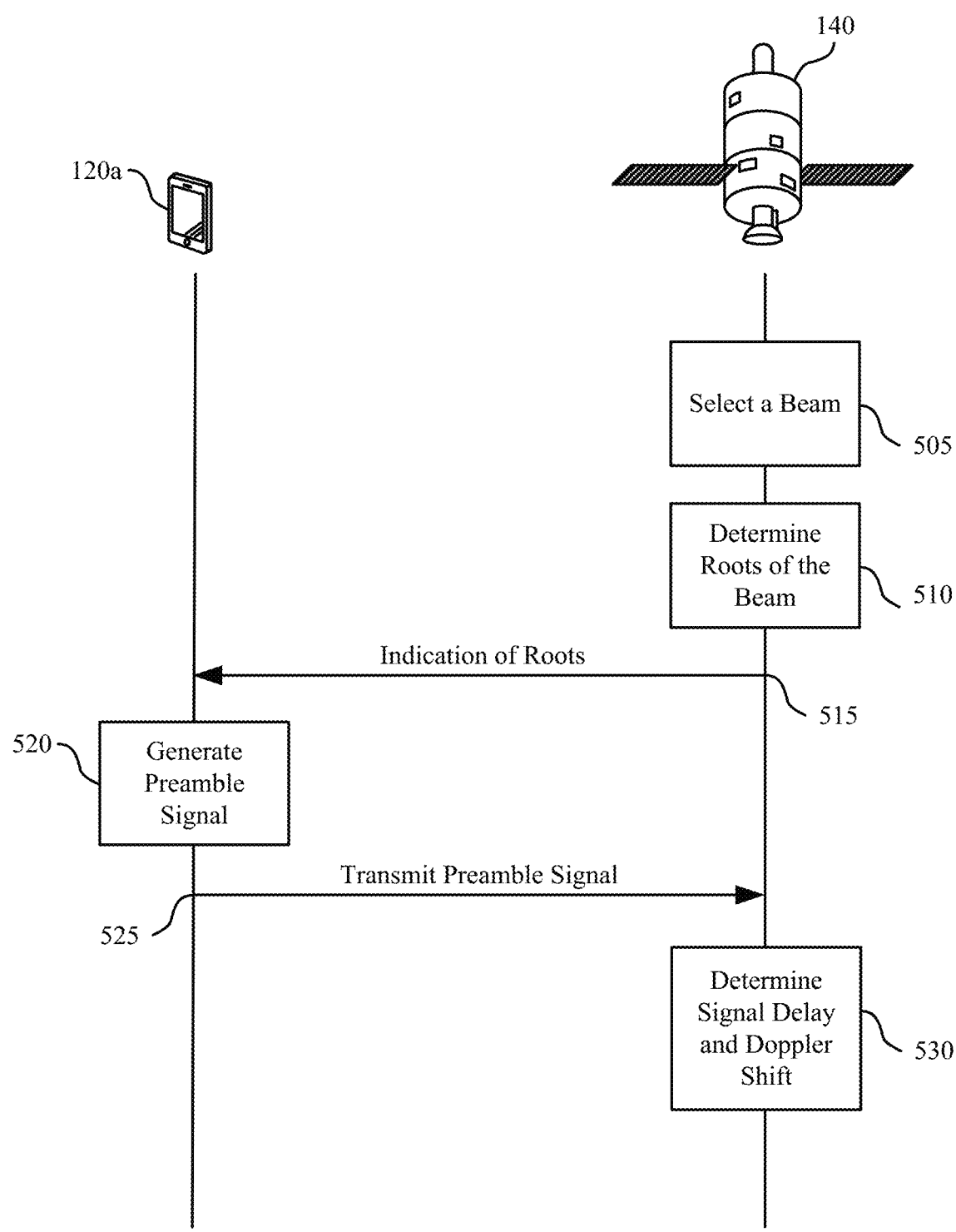
FIG. 5 is a call-flow diagram illustrating example signaling for selecting and communicating a multi-root preamble, in accordance with aspects of the present disclosure.

FIG. 5 is a call-flow diagram illustrating an example process for selecting and communicating multi-root preamble signaling. In some examples, the processes shown in FIG. 5 may be implemented by aspects of wireless communication network 100. UE 120a may be an example of 120a as described with reference to FIGS. 1-3. Satellite 140 may be an example of satellite 140 as described with reference to FIGS. 1-3. Satellite 140 may be an example of a non-terrestrial base station. In some cases, satellite 140 may instead be a base station 110 in a terrestrial network. Alternative examples of the following may be implemented, where some steps are performed in a different order than described or are not performed at all. In some cases, steps may include additional features not mentioned below, or further steps may be added.

At step 505, the satellite 140 selects a beam from a plurality of beams originating at the satellite 140. The satellite 140 can configure different PRACH formats (root pair sets, roots triplet sets, sequences, etc.) per beam depending on, for example, the maximum beam Doppler and RTD, as well as the desired accuracy of Doppler and delay times. In some examples, the satellite 140 is configured to calculate the maximum beam Doppler and RTD for the selected beam.

In certain aspects, the satellite 140 determines one or more parameters associated with the selected beam. For example, the one or more parameters may include at least a location of the beam, a size of the beam, an elevation of the beam, an angle of the beam, and any other suitable beam-forming characteristics of the selected beam.

At step 510, the satellite 140 determines a plurality of roots based on the one or more parameters associated with the beam, wherein each of the plurality of roots corresponds to one of a plurality of preamble sequences. The purpose of determining the plurality of roots is to prevent or reduce error in $b_0$ and $b_1$ of Equations 4-6 above. Any error in $b_0$ and $b_1$ may be amplified in the estimate of the Doppler and delay, which may cause inaccurate estimations. In certain aspects, in order to achieve accuracy in Doppler estimation, the satellite 140 may determine the plurality of roots based on the following:

$$(\mu_0^{-1} - \mu_1^{-1})^{-1} = X \quad (7)$$

In this example, $\mu_0^{-1}$ is an inverse of a first root, and $\mu_1^{-1}$ is an inverse of a second root, where X is a range of integer values (e.g., -3 through 3). It should be noted that X may be defined by any suitable range of values and still be within the scope of this disclosure. This technique may be based on Equation 4 above. Because a small error in $(b_0 - b_1)$ in Equations 4 above may lead to a large error in Doppler estimation, the satellite 140 may determine a first root and a second root such that Equation 7 is satisfied for the range of values. In one example, the satellite 140 determines a relatively small $\mu_0^{-1}$ such that $\mu_0^{-1} \in \{\pm 1, \pm 2, \pm 3, \ldots\}$. Alternatively, the satellite 140 may determining a conjugate of $\mu_0^{-1}$ such that: $\mu_0^{-1} \in \{L-1, L-2, L-3, \ldots\}$. For example, determining a relatively small value may render the following: $\{\mu_0^{-1}, \mu_1^{-1}\} = \{1, 2\}, \{-1, -2\}, \{2, 3\}$, and determining a conjugate may render the following: $\{\mu_0^{-1}, \mu_1^{-1}\} = \{32, 33\}, \{-32, -33\}$.

In certain aspects, in order to achieve accuracy in the delay estimation, the satellite 140 may determine the plurality of roots by choosing a first root having an inverse that is within the range of values (e.g., $\mu_0^{-1} \in \{\pm 1, \pm 2, \pm 3, \ldots\}$) and choosing a second root having an inverse that is a conjugate of the first root (e.g., $\mu_1^{-1} = L - \mu_0^{-1}$). This technique may be based on Equation 5 above. In this examples, when the roots are a conjugate of each other, satellite 140 can estimate delay based on an average of peak locations as follows:

$$\text{delay} = \text{mod}(b_0 + b_1, L)/2 \quad (8)$$

In some examples, the satellite 140 may determine the Doppler estimate using the delay estimate of Equation 8 by minimizing (e.g., selecting a root such that the inverse of the root is closer to zero) one or more of $\mu_0^{-1}$ or $\mu_1^{-1}$ such that Equation 7 is satisfied.

In another example, the satellite 140 may determine the delay estimate using the Doppler estimate determined using Equation 7 above. For example, once $(\mu_0^{-1} - \mu_1^{-1})^{-1}$ is determined, the satellite 140 can minimize $\mu_0^{-1}$ by selecting a $\mu_0^{-1}$ value from the range of values, such that $\mu_0^{-1} \in \{\pm 1, \pm 2, \pm 3, \ldots\}$.

In certain aspects, in order to achieve accuracy in the delay estimation, the satellite 140 may determine the plurality of roots using Equation 6 above. For example, the satellite 140 may choose a first root and a second root that satisfy the following:

$$(1 - \mu_0\mu_1^{-1})^{-1} = X \quad (9)$$

For example, the satellite 140 may choose $(1 - \mu_0\mu_1^{-1})^{-1} = 1$ or some other value within the range of values (X). In one example, the satellite 140 may set $(1 - \mu_0\mu_1^{-1})^{-1} = -1$ and $(\mu_0^{-1} - \mu_1^{-1})^{-1} = x$, wherein $x = \{\pm 1, \pm 2\}$, which results in $\mu_0 = -x^{-1}$ and $\mu_1 = (-2)^{-1}x^{-1}$.

Note that the Doppler and delay estimations described above with reference to Equations 4 and 7, Equations 5 and 8, and Equations 6 and 9 result in a determination, by the satellite 140, of a set of root pairs that satisfy the equations, and solve for both of a Doppler estimate and a RTD estimate. However, a particular set of roots selected for making the estimations may favor accuracy of a Doppler estimate over an RTD estimate, or the other way around. For example, a set of roots determined using Equation 7 above can be utilized for both a Doppler estimate and an RTD estimate, but those roots may provide higher accuracy to the Doppler estimate. Similarly, an RTD estimate using roots determined based on Equations 8 or 9 may have a higher accuracy than a Doppler estimate using the same roots.

In certain aspects, the satellite 140 may use a combination of Equations 4-6 or Equations 7-9 to determine a set of root triplets that may be utilized to solve for both the Doppler estimate and the RTD estimate. Thus, as the set of root pairs may favor accuracy for an estimate of a Doppler shift over an RTD, or vice-versa, the set of root triplets can be determined such that both the Doppler estimate and the RTD estimate are yielded high accuracy (e.g., neither the Doppler estimate or the RTD estimate is significantly more accurate than the other). For example, using Equation 7, the satellite 140 can determine a first root ($\mu_0^{-1}$) and a second root ($\mu_1^{-1}$) that can be used for both Doppler and RTD estimation, but will favor Doppler estimation in terms of accuracy. The satellite 140 may then use Equation 8 or 9 to determine a third root ($\mu_2^{-1}$) based on one or more of the first root and the second root determined using Equation 7. It should be noted that the determination of three or more roots by the satellite 140 can be accomplished using any combination of two or more of the equations set forth above.

In one example, where the root triplet includes $\mu_0$, $\mu_1$ and $\mu_2$, the satellite 140 can solve for Doppler shift by choosing $\mu_0$ and $\mu_1$ such that Equation 7 is satisfied, and solve for delay based on the chosen $\mu_1$ such that Equation 9 is satisfied. For example, the satellite 140 may choose $\mu_0$ and $\mu_1$ such that $(\mu_0^{-1}-\mu_1^{-1})^{-1}=X$, where X is a range of values (e.g., −2 through 2). Then, based on the chosen the satellite may choose $\mu_2$ such that $(1-\mu_1\mu_2^{-1})^{-1}=X$, where X is a range of values (e.g., −2 through 2).

At step 515, the satellite transmits control signaling over the beam to indicate the plurality of roots to one or more UEs and/or BSs. For example, the satellite 140 may broadcast, multi-cast, or unicast the control signaling. The control signaling may indicate the plurality of roots (e.g., sets of root pairs or sets of root triplets) determined by Equations 4 and 7, Equations 5 and 8, and Equations 6 and 9 above. Alternatively, the control signaling may indicate a plurality of preamble sequences to the UE that the UE may select from.

At step 520, the UE 120a may generate a preamble signal for PRACH based on the control signaling of step 515.

At step 525, the satellite 140 may receive the preamble signal generated by the UE 120a at step 520. It should be noted that, in reference to FIGS. 4A and 4B, the two or three sequences included in the preamble can be separated in time, separated in frequency, or modulated into a single OFDM symbol period and a single frequency resource. Based on the preamble signal, the satellite 140 may determine a signal delay and/or Doppler shift at step 530.

Figure 6:
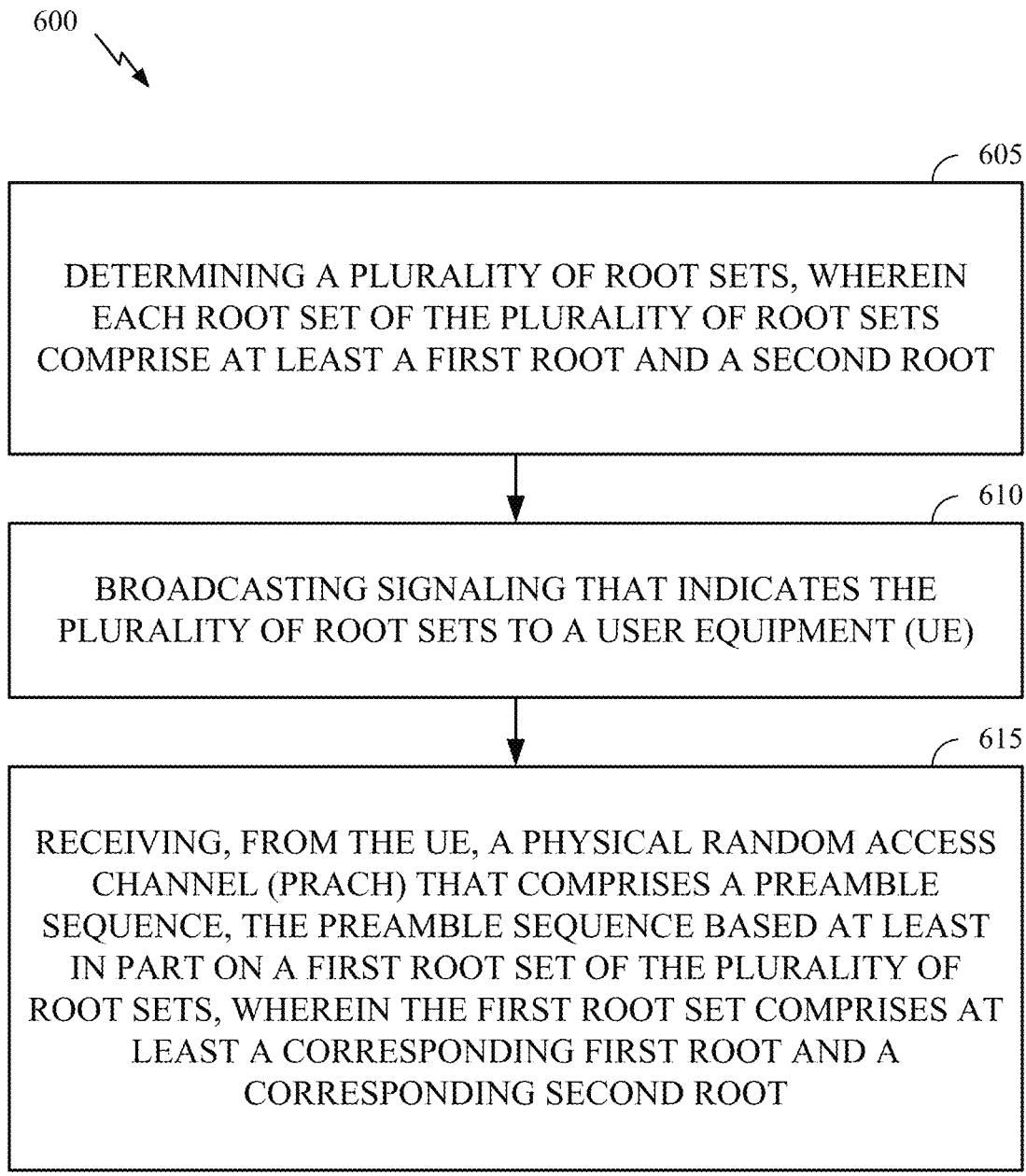
FIG. 6 is flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110a or satellite 140 in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, by determining a plurality of root sets, wherein each root set of the plurality of root sets comprise at least a first root and a second root.

The operations 600 may proceed to block 610, by broadcasting signaling that indicates the plurality of root sets.

The operations 600 may proceed to block 615, receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

In certain aspects, determining a plurality of root sets further comprises determining root sets for each beam of a plurality of beams based on one or more parameters associated with each beam; and broadcasting signaling that indicates the plurality of root sets further comprises transmitting one or more root sets over each beam of the plurality of beams.

In certain aspects, each root set of the plurality of root sets correspond to one of a plurality of preamble sequences; the preamble sequence comprises aspects corresponding to the corresponding first root and the corresponding second root; and the aspects corresponding to the corresponding first root and the corresponding second root are received over a same time period and frequency range.

In certain aspects, a modular multiplicative inverse of a difference between a modular multiplicative inverse of the corresponding first root and a modular multiplicative inverse of the corresponding second root is a first integer within a range of integers.

In certain aspects, the modular multiplicative inverse of the corresponding first root is one of: a second integer chosen from the range of integers, or a third integer being a difference between a sequence length of the corresponding first root and a fourth integer chosen from the range of integers.

In certain aspects, broadcasting signaling comprises broadcasting signaling that indicates the corresponding first root and the corresponding second root.

In certain aspects, a modular multiplicative inverse of the corresponding first root is a first integer within a range of integers; the corresponding second root is a conjugate of the corresponding first root; and broadcasting signaling comprises broadcasting signaling that indicates the corresponding first root and the corresponding second root.

In certain aspects, a modular multiplicative inverse of a difference between 1 and a product of the corresponding first root and a modular multiplicative inverse of the corresponding second root is a first integer within a range of integers; and broadcasting signaling comprises broadcasting signaling that indicates the corresponding first root and the corresponding second root such that a modular multiplicative inverse of difference between a modular multiplicative inverse of the corresponding first root and a modular multiplicative inverse of the corresponding second root is the first integer within the range of integers.

In certain aspects, a modular multiplicative inverse of a difference between a modular multiplicative inverse of the corresponding first root and a modular multiplicative inverse of the corresponding second root is a first integer within a range of integers; a modular multiplicative inverse of a difference between 1 and a product of the corresponding second root and an inverted third root of the first root set is a second integer within a range of integers; and broadcasting signaling comprises broadcasting signaling that indicates the first root set comprising the corresponding first root, the corresponding second root, and the third root.

In certain aspects, the preamble sequence is further based on the third root.

In certain aspects, the preamble sequence based at least in part on the corresponding first root, the corresponding second root, and the third root is received over a same time period and frequency range.

Figure 7:
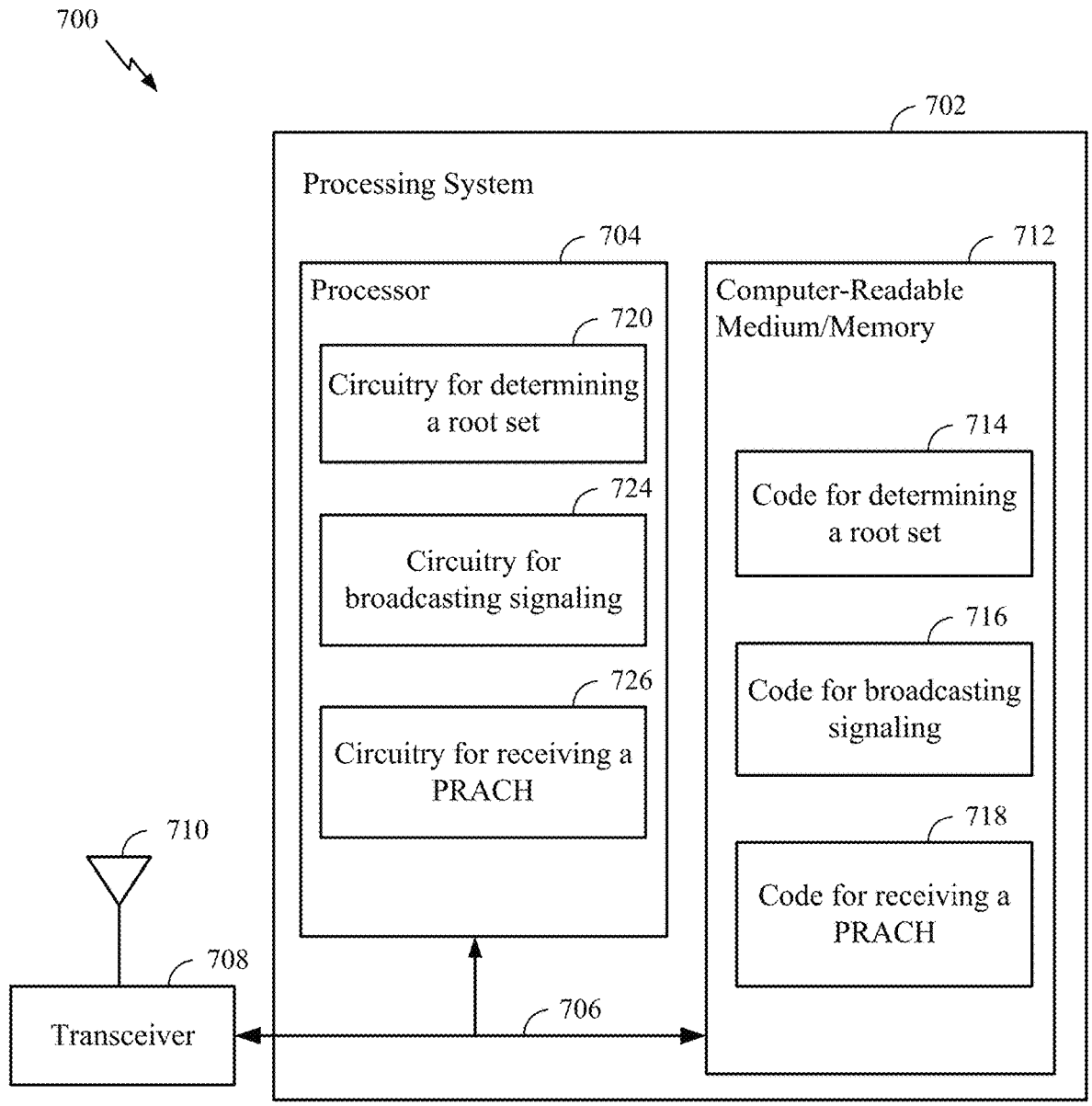
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 6. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 6, or other operations for performing the various techniques discussed herein for selecting root sets for two-root preambles. In certain aspects, computer-readable medium/memory 712 stores code 714 for determining a plurality of root sets, wherein each root set of the plurality of root sets comprise at least a first root and a second root; code 716 for broadcasting signaling that indicates the plurality of root sets; and code 718 for receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

In certain aspects, the processor 704 has circuitry configured to implement the code stored in the computer-readable medium/memory 712. The processor 704 includes circuitry 720 for determining a plurality of root sets, wherein each root set of the plurality of root sets comprise at least a first root and a second root; circuitry 724 for broadcasting signaling that indicates the plurality of root sets; and circuitry 726 for receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

Example Aspects

In a first aspects, a method of wireless communication at a base station (BS), comprising: determining a plurality of root sets, wherein each root set of the plurality of root sets comprise at least a first root and a second root; broadcasting signaling that indicates the plurality of root sets; and receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

In a second aspect, alone or in combination with the first aspect, wherein: determining a plurality of root sets further comprises determining root sets for each beam of a plurality of beams based on one or more parameters associated with each beam; and broadcasting signaling that indicates the plurality of root sets further comprises transmitting one or more root sets over each beam of the plurality of beams.

In a third aspect, alone or in combination with one or more of the first and second aspects, wherein: each root set of the plurality of root sets correspond to one of a plurality of preamble sequences; the preamble sequence comprises aspects corresponding to the corresponding first root and the corresponding second root; and the aspects corresponding to the corresponding first root and the corresponding second root are received over a same time period and frequency range.

In a fourth aspect, alone or in combination with one or more of the first through third aspects, wherein a modular multiplicative inverse of a difference between a modular multiplicative inverse of the corresponding first root and a modular multiplicative inverse of the corresponding second root is a first integer within a range of integers.

In a fifth aspect, alone or in combination with one or more of the first through fourth aspects, wherein the modular multiplicative inverse of the corresponding first root is one of: a second integer chosen from the range of integers, or a third integer being a difference between a sequence length of the corresponding first root and a fourth integer chosen from the range of integers.

In a sixth aspect, alone or in combination with one or more of the first through fifth aspects, wherein broadcasting signaling comprises broadcasting signaling that indicates the corresponding first root and the corresponding second root.

In a seventh aspect, alone or in combination with one or more of the first through sixth aspects, wherein: a modular multiplicative inverse of the corresponding first root is a first integer within a range of integers; the corresponding second root is a conjugate of the corresponding first root; and broadcasting signaling comprises broadcasting signaling that indicates the corresponding first root and the corresponding second root.

In an eighth aspect, alone or in combination with one or more of the first through seventh aspects, wherein: a modular multiplicative inverse of a difference between 1 and a product of the corresponding first root and a modular multiplicative inverse of the corresponding second root is a first integer within a range of integers; and broadcasting signaling comprises broadcasting signaling that indicates the corresponding first root and the corresponding second root such that a modular multiplicative inverse of a difference between a modular multiplicative inverse of the corresponding first root and the modular multiplicative inverse of the corresponding second root is the first integer within the range of integers.

In a ninth aspect, alone or in combination with one or more of the first through eighth aspects, wherein: a modular multiplicative inverse of a difference between a modular multiplicative inverse of the corresponding first root and a modular multiplicative inverse of the corresponding second root is a first integer within a range of integers; a modular multiplicative inverse of a difference between 1 and a product of the corresponding second root and an inverted third root of the first root set is a second integer within a range of integers; and broadcasting signaling comprises broadcasting signaling that indicates the first root set comprising the corresponding first root, the corresponding second root, and the third root.

In a tenth aspect, alone or in combination with one or more of the first through ninth aspects, wherein the preamble sequence is further based on the third root.

In an eleventh aspect, alone or in combination with one or more of the first through tenth aspects, wherein the preamble sequence based at least in part on the corresponding first root, the corresponding second root, and the third root is received over a same time period and frequency range.

In a twelfth aspect, a base station (BS), comprises a memory; and a processor communicatively coupled to the memory, wherein the processor is configured to: determine a plurality of root sets, wherein each root set of the plurality of root sets comprise at least a first root and a second root; and a transceiver configured to: broadcast signaling that indicates the plurality of root sets; and receive, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

In a thirteenth aspect, alone or in combination with the twelfth aspect, wherein the processor is further configured to determine a plurality of root sets further comprises determining root sets for each beam of a plurality of beams based on one or more parameters associated with each beam; and broadcast signaling that indicates the plurality of root sets to the UE further comprises transmitting a corresponding root set over each beam of the plurality of beams.

In a fourteenth aspect, alone or in combination with one or more of the twelfth and thirteenth aspects, wherein: each root set of the plurality of root sets correspond to one of a plurality of preamble sequences; the preamble sequence comprises aspects corresponding to the corresponding first root and the corresponding second root; and the aspects corresponding to the corresponding first root and the corresponding second root are received over a same time period and frequency range.

In a fifteenth aspect, alone or in combination with one or more of the twelfth through fourteenth aspects, wherein a modular multiplicative inverse of a difference between a modular multiplicative inverse of the corresponding first root and a modular multiplicative inverse of the corresponding second root is a first integer within a range of integers.

In a sixteenth aspect, alone or in combination with one or more of the twelfth through fifteenth aspects, wherein the modular multiplicative inverse of the corresponding first root is one of: a second integer chosen from the range of integers, or a third integer being a difference between a sequence length of the corresponding first root and a fourth integer chosen from the range of integers.

In a seventeenth aspect, alone or in combination with one or more of the twelfth through sixteenth aspects, wherein the processor, being configured to broadcast signaling, is further configured to broadcast signaling that indicates the corresponding first root and the corresponding second root.

In an eighteenth aspect, alone or in combination with one or more of the twelfth through seventeenth aspects, wherein:

a modular multiplicative inverse of the corresponding first root is a first integer within a range of integers; the corresponding second root is a conjugate of the corresponding first root; and the processor, being configured to broadcast signaling, is further configured to broadcast signaling that indicates the corresponding first root and the corresponding second root.

In a nineteenth aspect, alone or in combination with one or more of the twelfth through eighteenth aspects, wherein: a modular multiplicative inverse of a difference between 1 and a product of the corresponding first root and a modular multiplicative inverse of the corresponding second root is a first integer within a range of integers; and the processor, being configured to broadcast signaling, is further configured to broadcast signaling that indicates the corresponding first root and the corresponding second root such that a modular multiplicative inverse of a difference between a modular multiplicative inverse of the corresponding first root and the modular multiplicative inverse of the corresponding second root is the first integer within the range of integers.

In a twentieth aspect, alone or in combination with one or more of the twelfth through nineteenth aspects, wherein: a modular multiplicative inverse of a difference between a modular multiplicative inverse of the corresponding first root and a modular multiplicative inverse of the corresponding second root is a first integer within a range of integers; a modular multiplicative inverse of a difference between 1 and a product of the corresponding second root and an inverted third root of the first root set is a second integer within a range of integers; and the processor, being configured to broadcast signaling, is further configured to broadcast signaling that indicates the first root set comprising the corresponding first root, the corresponding second root, and the third root.

In a twenty-first aspect, alone or in combination with one or more of the twelfth through twentieth aspects, wherein the preamble sequence is further based on the third root.

In a twenty-second aspect, alone or in combination with one or more of the twelfth through twenty-first aspects, wherein the preamble sequence based at least in part on the corresponding first root, the corresponding second root, and the third root is received over a same time period and frequency range.

In a twenty-third aspect a base station (BS), comprises means for determining a plurality of root sets, wherein each root set of the plurality of root sets comprise at least a first root and a second root; and means for broadcasting signaling that indicates the plurality of root sets; means for receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root In a twenty-fourth aspect, alone or in combination with the twenty-third aspect, wherein: the means for determining a plurality of root sets further comprises means for determining root sets for each beam of a plurality of beams based on one or more parameters associated with each beam; and the means for broadcasting signaling that indicates the plurality of root sets to the UE further comprises means for transmitting a corresponding root set over each beam of the plurality of beams.

In a twenty-fifth aspect, alone or in combination with one or more of the twenty-third aspect and the twenty-fourth aspect, wherein: each root set of the plurality of root sets correspond to one of a plurality of preamble sequences; the preamble sequence comprises aspects corresponding to the corresponding first root and the corresponding second root; and the aspects corresponding to the corresponding first root and the corresponding second root are received over a same time period and frequency range.

In a twenty-sixth aspect, alone or in combination with one or more of the twenty-third through twenty-fifth aspects, wherein a modular multiplicative inverse of a difference between a modular multiplicative inverse of the first root and a modular multiplicative inverse of the second root is a first integer within a range of integers.

In a twenty-seventh aspect, alone or in combination with one or more of the twenty-third through twenty-sixth aspects, wherein the modular multiplicative inverse of the corresponding first root is one of: a second integer chosen from the range of integers, or a third integer being a difference between a sequence length of the corresponding first root and a fourth integer chosen from the range of integers.

In a twenty-eighth aspect, alone or in combination with one or more of the twenty-third through twenty-seventh aspects, wherein the means for broadcasting signaling comprises means for broadcasting signaling that indicates the corresponding first root and the corresponding second root.

In a twenty-ninth aspect, alone or in combination with one or more of the twenty-third through twenty-eighth aspects, wherein: a modular multiplicative inverse of the corresponding first root is a first integer within a range of integers; the corresponding second root is a conjugate of the corresponding first root; and the means for broadcasting signaling comprises means for broadcasting signaling that indicates the corresponding first root and the corresponding second root.

In a thirtieth aspect, a non-transitory computer-readable storage medium that stores instructions that, when executed by a processor of a base station (BS), cause the BS to perform a method of wireless communication, the method comprising: determining a plurality of root sets, wherein each root set of the plurality of root sets comprise at least a first root and a second root; broadcasting signaling that indicates the plurality of root sets; and receiving, from a user equipment (UE), a physical random access channel (PRACH) that comprises a preamble sequence, the preamble sequence based at least in part on a first root set of the plurality of root sets, wherein the first root set comprises at least a corresponding first root and a corresponding second root.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G LTE, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication at a network entity, comprising:
   determining a plurality of root sets, wherein each root set of the plurality of root sets comprises at least a first root Zadoff-Chu (ZC) sequence generated from a first root and a second root ZC sequence generated from a second root;
   transmitting signaling that indicates the plurality of root sets; and
   receiving, from a user equipment (UE), a physical random access channel (PRACH) message that comprises a multi-root preamble sequence including the first root ZC sequence of a first root set of the plurality of root sets, the second root ZC sequence of the first root set, and a third root ZC sequence of the first root set, wherein the multi-root preamble sequence based at least in part on the first root ZC sequence of the first root set, the second root ZC sequence of the first root set, and the third root ZC sequence is received over a same time period and frequency range.

2. The method of claim 1, wherein:
   determining a plurality of root sets further comprises determining root sets for each beam of a plurality of beams based on one or more parameters associated with each beam; and
   transmitting signaling that indicates the plurality of root sets to the UE further comprises transmitting one or more root sets over each beam of the plurality of beams.

3. The method of claim 1, wherein:
   each root set of the plurality of root sets corresponds to one of a plurality of multi-root preamble sequences;
   the multi-root preamble sequence comprises aspects corresponding to the first root ZC sequence of the first root set and the second root ZC sequence of the first root set; and
   the aspects corresponding to the first root ZC sequence of the first root set and the second root ZC sequence of the first root set are received over a same time period and frequency range.

4. The method of claim 1, wherein a modular multiplicative inverse of a difference between a modular multiplicative inverse of the first root ZC sequence of the first root set and a modular multiplicative inverse of the second root ZC sequence of the first root set is a first integer within a range of integers.

5. The method of claim 4, wherein the modular multiplicative inverse of the first root ZC sequence of the first root set is one of:
   a second integer chosen from the range of integers, or
   a third integer being a difference between a sequence length of the first root ZC sequence of the first root set and a fourth integer chosen from the range of integers.

6. The method of claim 4, wherein transmitting signaling comprises transmitting signaling that indicates the first root ZC sequence of the first root set and the second root ZC sequence of the first root set.

7. The method of claim 1, wherein:
   a modular multiplicative inverse of the first root ZC sequence of the first root set is a first integer within a range of integers;
   the second root ZC sequence of the first root set is a conjugate of the first root ZC sequence of the first root set; and
   transmitting signaling comprises transmitting signaling that indicates the first root ZC sequence of the first root set and the second root ZC sequence of the first root set.

8. The method of claim 1, wherein:
   a modular multiplicative inverse of a difference between 1 and a product of the first root ZC sequence of the first root set and a modular multiplicative inverse of the second root ZC sequence of the first root set is a first integer within a range of integers; and
   transmitting signaling comprises transmitting signaling that indicates the first root ZC sequence of the first root set and the second root ZC sequence of the first root set such that an inverted difference between a modular multiplicative inverse of the first root ZC sequence of the first root set and the modular multiplicative inverse of the second root ZC sequence of the first root set is the first integer within the range of integers.

9. The method of claim 1, wherein:
   a modular multiplicative inverse of a difference between a modular multiplicative inverse of the first root ZC sequence of the first root set and a modular multiplicative inverse of the second root ZC sequence of the first root set is a first integer within a range of integers;
   an modular multiplicative inverse of a difference between 1 and a product of the second root ZC sequence of the first root set and an inverse of the third root ZC sequence of the first root set is a second integer within a range of integers; and
   transmitting signaling comprises transmitting signaling that indicates the first root set comprising the first root ZC sequence of the first root set, the second root ZC sequence of the first root set, and the third root ZC sequence.

10. A network entity, comprising:
    one or more processors individually or collectively configured to execute instructions stored on one or more memories and to cause the network entity to:
    determine a plurality of root sets, wherein each root set of the plurality of root sets comprises at least a first root Zadoff-Chu (ZC) sequence generated from a first root and a second root ZC sequence generated from a second root;
    transmit signaling that indicates the plurality of root sets; and
    receive, from a user equipment (UE), a physical random access channel (PRACH) message that comprises a multi-root preamble sequence including the first root ZC sequence of a first root set of the plurality of root sets, the second root ZC sequence of the first root set, and a third root ZC sequence of the first root set, wherein the one or more processors are configured to cause the network entity to receive the multi-root preamble sequence over a same time period and frequency range based at least in part on the first root ZC sequence of the first root set, the second root ZC sequence of the first root set, and the third root ZC sequence.

11. The network entity of claim 10, wherein:
in order to determine the plurality of root sets, the one or more processors are further configured to cause the network entity to determine root sets for each beam of a plurality of beams based on one or more parameters associated with each beam; and
in order to transmit the signaling that indicates the plurality of root sets, the one or more processors are configured to cause the network entity to transmit a corresponding root set over each beam of the plurality of beams.

12. The network entity of claim 10, wherein:
each root set of the plurality of root sets corresponds to one of a plurality of multi-root preamble sequences;
the multi-root preamble sequence comprises aspects corresponding to the first root ZC sequence of the first root set and the second root ZC sequence of the first root set; and
the aspects corresponding to the first root ZC sequence of the first root set and the second root ZC sequence of the first root set are received over a same time period and frequency range.

13. The network entity of claim 10, wherein a modular multiplicative inverse of a difference between a modular multiplicative inverse of the first root ZC sequence of the first root set and a modular multiplicative inverse of the second root ZC sequence of the first root set is a first integer within a range of integers.

14. The network entity of claim 13, wherein the modular multiplicative inverse of the first root ZC sequence of the first root set is one of:
a second integer chosen from the range of integers, or
a third integer being a difference between a sequence length of the first root ZC sequence of the first root set and a fourth integer chosen from the range of integers.

15. The network entity of claim 13, the one or more processors are further configured to cause the network entity to transmit signaling that indicates the first root ZC sequence of the first root set and the second root ZC sequence of the first root set.

16. The network entity of claim 10, wherein:
a modular multiplicative inverse of the first root ZC sequence of the first root set is a first integer within a range of integers;
the second root ZC sequence of the first root set is a conjugate of the first root ZC sequence of the first root set; and
the one or more processors are further configured to cause the network entity to transmit signaling that indicates the first root ZC sequence of the first root set and the second root ZC sequence of the first root set.

17. The network entity of claim 10, wherein:
a modular multiplicative inverse of a difference between 1 and a product of the first root ZC sequence of the first root set and a modular multiplicative inverse of the second root ZC sequence of the first root set is a first integer within a range of integers; and
the one or more processors are further configured to cause the network entity to transmit signaling that indicates the first root ZC sequence of the first root set and the second root ZC sequence of the first root set such that an inverted difference between a modular multiplicative inverse of the first root ZC sequence of the first root set and the modular multiplicative inverse of the second root ZC sequence of the first root set is the first integer within the range of integers.

18. The network entity of claim 10, wherein:
a modular multiplicative inverse of a difference between a modular multiplicative inverse of the first root ZC sequence of the first root set and a modular multiplicative inverse of the second root ZC sequence of the first root set is a first integer within a range of integers;
a modular multiplicative inverse of a difference between 1 and a product of the second root ZC sequence of the first root set and an inverse of the third root ZC sequence of the first root set is a second integer within a range of integers; and
the one or more processors are further configured to cause the network entity to transmit signaling that indicates the first root set comprising the first root ZC sequence of the first root set, the second root ZC sequence of the first root set, and the third root ZC sequence.

19. A network entity, comprising:
means for determining a plurality of root sets, wherein each root set of the plurality of root sets comprises at least a first root Zadoff-Chu (ZC) sequence generated from a first root and a second root ZC sequence generated from a second root;
means for transmitting signaling that indicates the plurality of root sets; and
means for receiving, from a user equipment (UE), a physical random access channel (PRACH) message that comprises a multi-root preamble sequence including the first root ZC sequence of a first root set of the plurality of root sets, the second root ZC sequence of the first root set, and a third root ZC sequence of the first root set, wherein the means for receiving comprise means for receiving the multi-root preamble sequence over a same time period and frequency range based at least in part on the first root ZC sequence of the first root set, the second root ZC sequence of the first root set, and the third root ZC sequence is received.

20. The network entity of claim 19, wherein:
the means for determining a plurality of root sets further comprises means for determining root sets for each beam of a plurality of beams based on one or more parameters associated with each beam; and
the means for transmitting signaling that indicates the plurality of root sets to the UE further comprises means for transmitting a corresponding root set over each beam of the plurality of beams.

21. The network entity of claim 19, wherein:
each root set of the plurality of root sets corresponds to one of a plurality of multi-root preamble sequences;
the multi-root preamble sequence comprises aspects corresponding to the first root ZC sequence of the first root set and the second root ZC sequence of the first root set; and
the aspects corresponding to the first root ZC sequence of the first root set and the second root ZC sequence of the first root set are received over a same time period and frequency range.

22. The network entity of claim 19, wherein a modular multiplicative inverse of a difference between a modular multiplicative inverse of the first root ZC sequence of the first root set and a modular multiplicative inverse of the second root ZC sequence of the first root set is a first integer within a range of integers.

23. The network entity of claim 22, wherein the modular multiplicative inverse of the first root ZC sequence of the first root set is one of:
- a second integer chosen from the range of integers, or
- a third integer being a difference between a sequence length of the first root ZC sequence of the first root set and a fourth integer chosen from the range of integers.

24. The network entity of claim 22, wherein the means for transmitting signaling comprises means for transmitting signaling that indicates the first root ZC sequence of the first root set and the second root ZC sequence of the first root set.

25. The network entity of claim 19, wherein:
- a modular multiplicative inverse of the first root ZC sequence of the first root set is a first integer within a range of integers;
- the second root ZC sequence of the first root set is a conjugate of the first root ZC sequence of the first root set; and
- the means for transmitting signaling comprises means for transmitting signaling that indicates the first root ZC sequence of the first root set and the second root ZC sequence of the first root set.

26. A non-transitory computer-readable storage medium that stores instructions that, when executed by one or more processors of a network entity, cause the network entity to:
- determine a plurality of root sets, wherein each root set of the plurality of root sets comprises at least a first root Zadoff-Chu (ZC) sequence generated from a first root and a second root ZC sequence generated from a second root;
- transmit signaling that indicates the plurality of root sets; and
- receive, from a user equipment (UE), a physical random access channel (PRACH) message that comprises a multi-root preamble sequence including the first root ZC sequence of a first root set of the plurality of root sets, the second root ZC sequence of the first root set, and a third root ZC sequence of the first root set, wherein instructions cause the multi-root preamble sequence to be received over a same time period and frequency range based at least in part on the first root ZC sequence of the first root set, the second root ZC sequence of the first root set, and the third root ZC sequence.

* * * * *